(12) United States Patent
Lin (10) Patent No.: US 9,057,881 B2
(45) Date of Patent: Jun. 16, 2015

(54) ILLUMINATION SYSTEM FOR A PROJECTION APPARATUS AND PROJECTION APPARATUS

(71) Applicant: DELTA ELECTRONICS, INC., Taoyuan Hsien (TW)

(72) Inventor: Hung Ying Lin, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 256 days.

(21) Appl. No.: 13/782,321

(22) Filed: Mar. 1, 2013

(65) Prior Publication Data

US 2013/0271730 A1    Oct. 17, 2013

(30) Foreign Application Priority Data

Apr. 17, 2012   (TW) .............................. 101113539 A (51) Int. Cl.
| | |
|---|---|
| G03B 21/00 | (2006.01) |
| G02B 27/26 | (2006.01) |
| G02B 27/28 | (2006.01) |
| G02B 26/00 | (2006.01) |
| H04N 9/31 | (2006.01) |
| H04N 13/04 | (2006.01) |

(52) U.S. Cl.
CPC .............. *G02B 27/26* (2013.01); *G02B 27/283* (2013.01); *G02B 26/008* (2013.01); *H04N 9/3167* (2013.01); *H04N 13/0434* (2013.01); *H04N 13/0459* (2013.01)

(58) Field of Classification Search
CPC .... G02B 27/26; G02B 27/283; G02B 26/008; H04N 9/3167; H04N 2209/043
USPC ............... 353/8, 20, 98; 362/19, 516, 296.01, 362/327, 341, 346; 349/67, 113, 96; 359/465, 208.1, 485.01, 484.04, 584
See application file for complete search history.

(56) References Cited

U.S. PATENT DOCUMENTS

| | | | |
|---|---|---|---|
| 5,940,149 A | 8/1999 | Vanderwerf | |
| 7,230,759 B2 | 6/2007 | Huang et al. | |
| 7,479,933 B2 | 1/2009 | Weissman | |
| 2002/0085177 A1* | 7/2002 | Lee | ................................ 353/20 |
| 2003/0076423 A1* | 4/2003 | Dolgoff | ..................... 348/222.1 |
| 2005/0231690 A1 | 10/2005 | Newell et al. | |

FOREIGN PATENT DOCUMENTS

| | | |
|---|---|---|
| CN | 2465207 Y | 12/2001 |
| CN | 101950100 A | 1/2011 |
| TW | 363143 | 7/1999 |
| TW | 424156 B | 3/2001 |
| TW | 430746 | 4/2001 |
| TW | I243960 | 11/2005 |
| TW | I259291 B | 8/2006 |
| TW | I349113 B1 | 9/2011 |

* cited by examiner

*Primary Examiner* — William C Dowling
*Assistant Examiner* — Magda Cruz
(74) *Attorney, Agent, or Firm* — Cantor Colburn LLP (57) ABSTRACT

An illumination system and a projection apparatus adopting the illumination system are provided. The projection apparatus comprises the illumination system and a light modulator. The illumination system comprises at least one light source, a curved reflecting component, a phosphor wheel, a polarizer and a half wave retarder. The light provided by the at least one light source passes through the curved reflecting component and the phosphor wheel to provide a first light in a first time sequence and a second light in a second time sequence. The first light and the second light are transformed into a first polarized light and a second polarized light respectively in different time sequences by the polarizer and the half wave retarder.

12 Claims, 7 Drawing Sheets

ILLUMINATION SYSTEM FOR A PROJECTION APPARATUS AND PROJECTION APPARATUS

This application claims priority under 35 U.S.C. §119 to to Taiwan Patent Application No. 101113539 filed on Apr. 17, 2012, the entire content of which is incorporated herein by reference.

CROSS-REFERENCES TO RELATED APPLICATIONS

Not applicable.

BACKGROUND OF THE INVENTION

1. Field of the Invention

The present invention relates to an illumination system and a projection apparatus adopting the illumination system, and more particularly, to an illumination system that uses a curved reflecting component in combination with a polarizer and a half wave retarder.

2. Descriptions of the Related Art

Over recent years, digital light processing (DLP) projection systems have found a wide application in projection apparatuses because of their advantages, such as a high brightness, realistic colors, a rapid response speed and a light weight. Aside from DLP projection systems that are generally used to display two-dimensional (2D) images, there are also DLP projection systems used to display stereoscopic images.

DLP projection systems for displaying stereoscopic images are generally divided into the eyeglass type and the auto-stereoscopic type. DLP projection systems of the eyeglass type have a low production cost and have been widely used since the advent thereof. According to the conventional stereoscopic projection technology of the eyeglass type, two projectors are arranged in a row to simulate images visible to the left eye and the right eye of a viewer respectively and a polarizer is installed in front of each of the projectors. By adjusting positions at which images are projected to the left eyeglass and the right eyeglass, different images will be seen at the imaging positions by the left eye and the right eye respectively, thus achieving a stereoscopic displaying effect.

However, in order to have the images projected by the two projectors overlapped at a same position, the two projectors must be aligned precisely. Therefore, when service locations of the projectors are changed, alignment of the two projectors must be calibrated and adjusted anew. Furthermore, use of the two projectors not only occupies a large space but also leads to a high cost.

Accordingly, an urgent need exists in the art to design a stereoscopic image projection apparatus that can be used with a pair of passive eyeglasses and that has a low cost, a simplified optical arrangement and a miniaturized volume.

SUMMARY OF THE INVENTION

The primary objective of the present invention is to provide an illumination system and a projection apparatus, which achieve a stereoscopic displaying effect by alternately switching between polarized lights with different polarization directions provided by the illumination system so that different polarized images can be seen by the left eye and the right eye respectively. This can avoid the problem that arrangement of two conventional projectors occupies a large area and leads to a high cost. Another objective of the present invention is to provide an illumination system and a projection apparatus. Because the projection apparatus of the present invention can be used with a pair of passive eyeglasses, is less costly, convenient to use and not liable to damage, the overall cost can be reduced and the convenience in use can be improved. Furthermore, as compared to the practice of using active polarizers, the use of polarized lights to display stereoscopic images can deliver a higher brightness.

Yet a further objective of the present invention is to provide an illumination system and a projection apparatus, which generate a left-hand polarized light and a right-hand polarized light by using a quarter wave retarder in the illumination system.

To achieve the aforesaid objectives, the present invention provides an illumination system for a projection apparatus and the projection apparatus. The projection apparatus comprises the illumination system and a light modulator. The illumination system comprises at least one light source, a curved reflecting component, a phosphor color wheel, a polarizer and a half wave retarder. The at least one light source is adapted to generate a light. After the light penetrates the phosphor color wheel in a first time sequence, a first light is reflected from the curved reflecting component; and after the light is reflected from the phosphor color wheel in a second time sequence, a second light is reflected from the curved reflecting component. The polarizer is adapted to split the first light into a first beam having a first polarization direction and a second beam having a second polarization direction in the first time sequence, and split the second light into a third beam having the first polarization direction and a fourth beam having the second polarization direction in the second time sequence. After the first beam and the second beam pass through a first time sequence portion of the half wave retarder in the first time sequence, the first beam and the second beam are transformed into a first polarized light having the first polarization direction; and after the third beam and the fourth beam pass through a second time sequence portion of the half wave retarder in the second time sequence, the third beam and the fourth beam are transformed into a second polarized light having the second polarization direction. The light modulator is adapted to receive and transform the first polarized light into a first view angle image in the first time sequence, and receive and transform the second polarized light into a second view angle image in the second time sequence. Then, the first view angle image and the second view angle image can be received by the left eye and the right eye of a user who wears a pair of passive eyeglasses so that a stereoscopic image is formed.

The half wave retarder of the illumination system is formed on a first surface of a sheet glass. The illumination system further comprises a quarter wave retarder, and the half wave retarder is disposed between the quarter wave retarder and the polarizer. The quarter wave retarder may also be disposed on a second surface of the sheet glass opposite to the first on the surface in which the half wave retarder is formed. Furthermore, the half wave retarder may also be formed on a surface of a quarter wave retarder. The at least one light source is a light emitting diode (LED) or a laser. The illumination system further comprises a light homogenizing component to homogenize the first light and the second light, and the light homogenizing component is a lens array, a fly lens, an integration rod, or a light tunnel. The curved reflecting component comprises at least one curved surface which is an ellipsoid or a paraboloid. The curved surface has a focus, while the phosphor color wheel is coated with at least one phosphor on the focus. The curved surface is coated with a light splitting coating film which only allows lights of a special waveband to pass therethrough. Furthermore, the light modulator is a digital micromirror device (DMD) or a liquid crystal display (LCD) panel.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
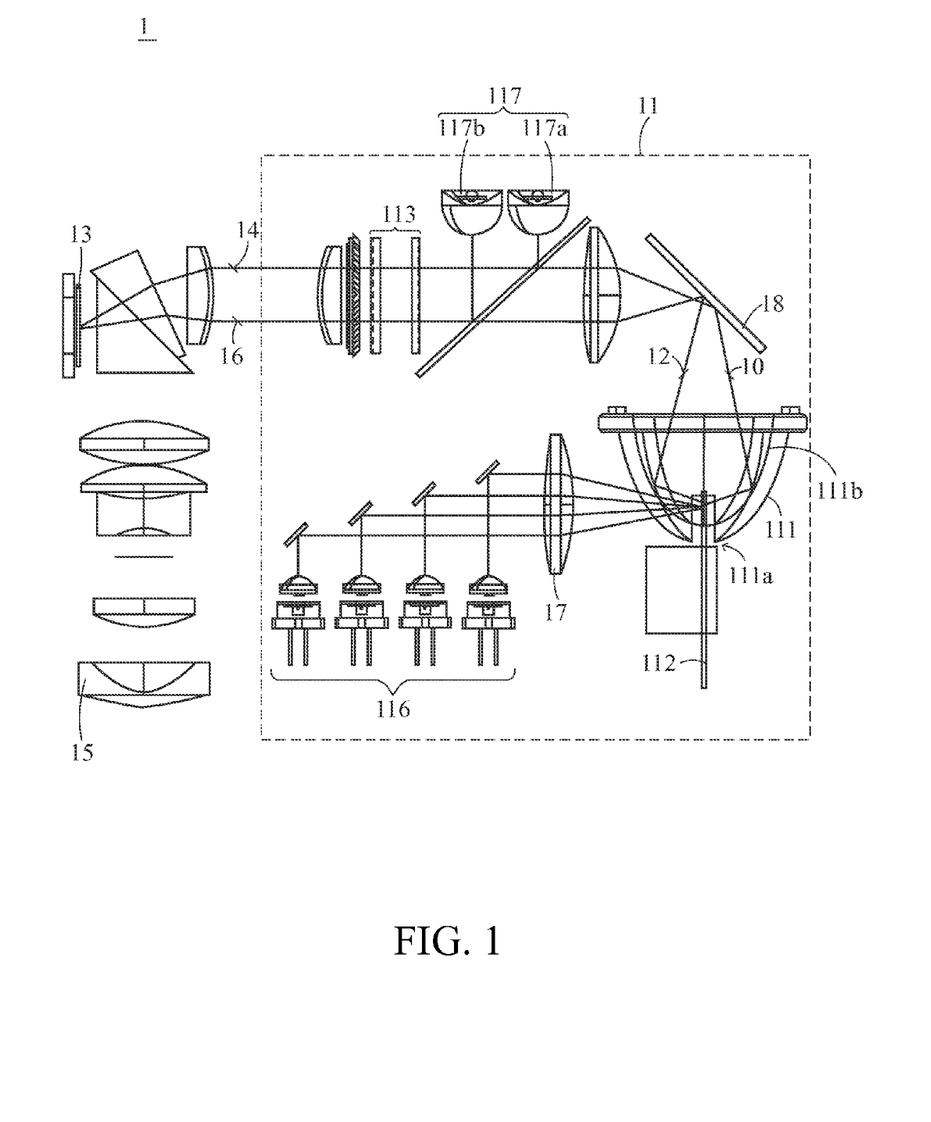
FIG. 1 is a schematic view illustrating an internal structure of a projection apparatus according to an embodiment of the present invention.
Figure 3A:
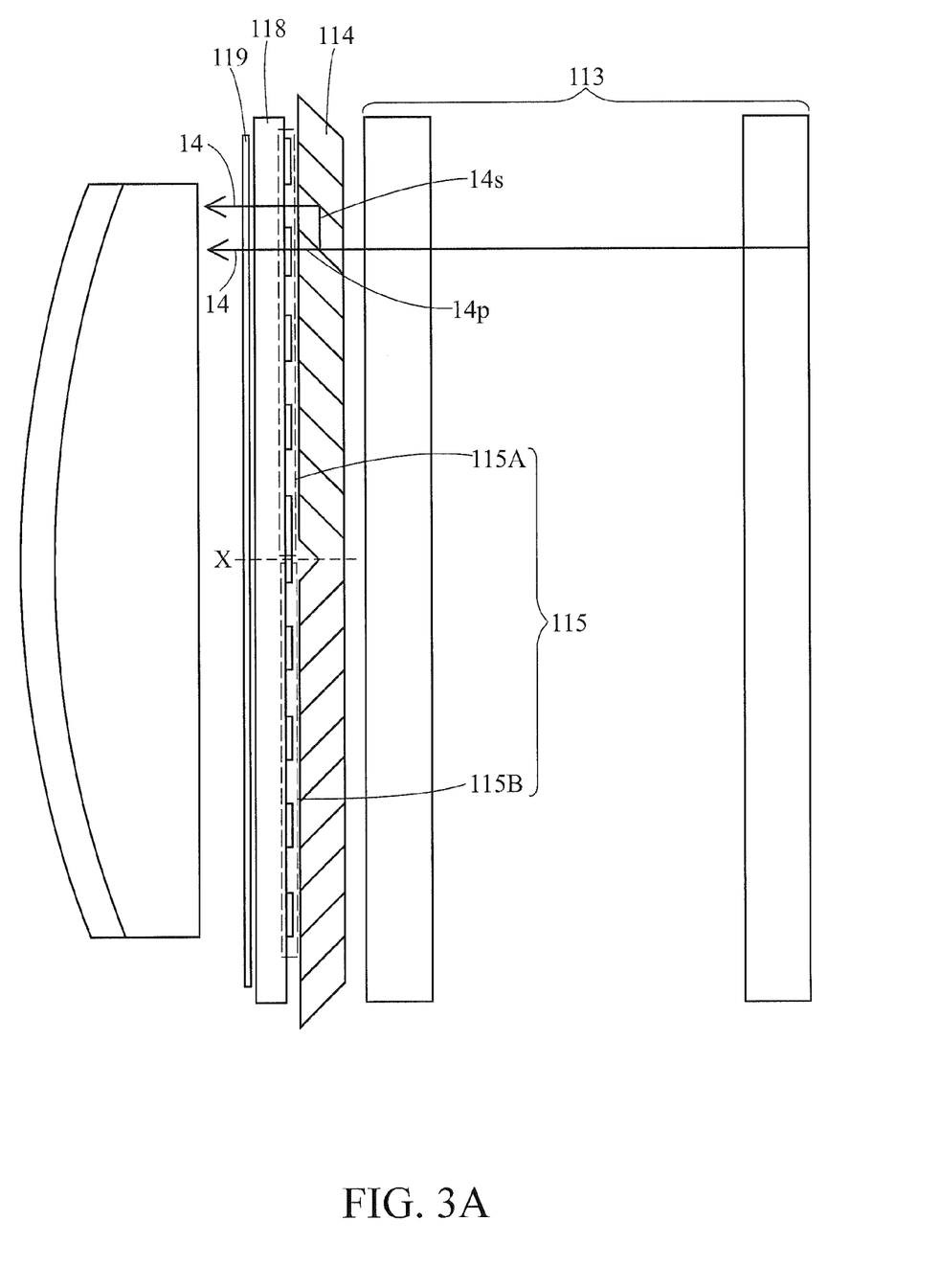
FIG. 3A is a schematic view illustrating a partial light path in a first time sequence according to the embodiment of the present invention.
Figure 3B:
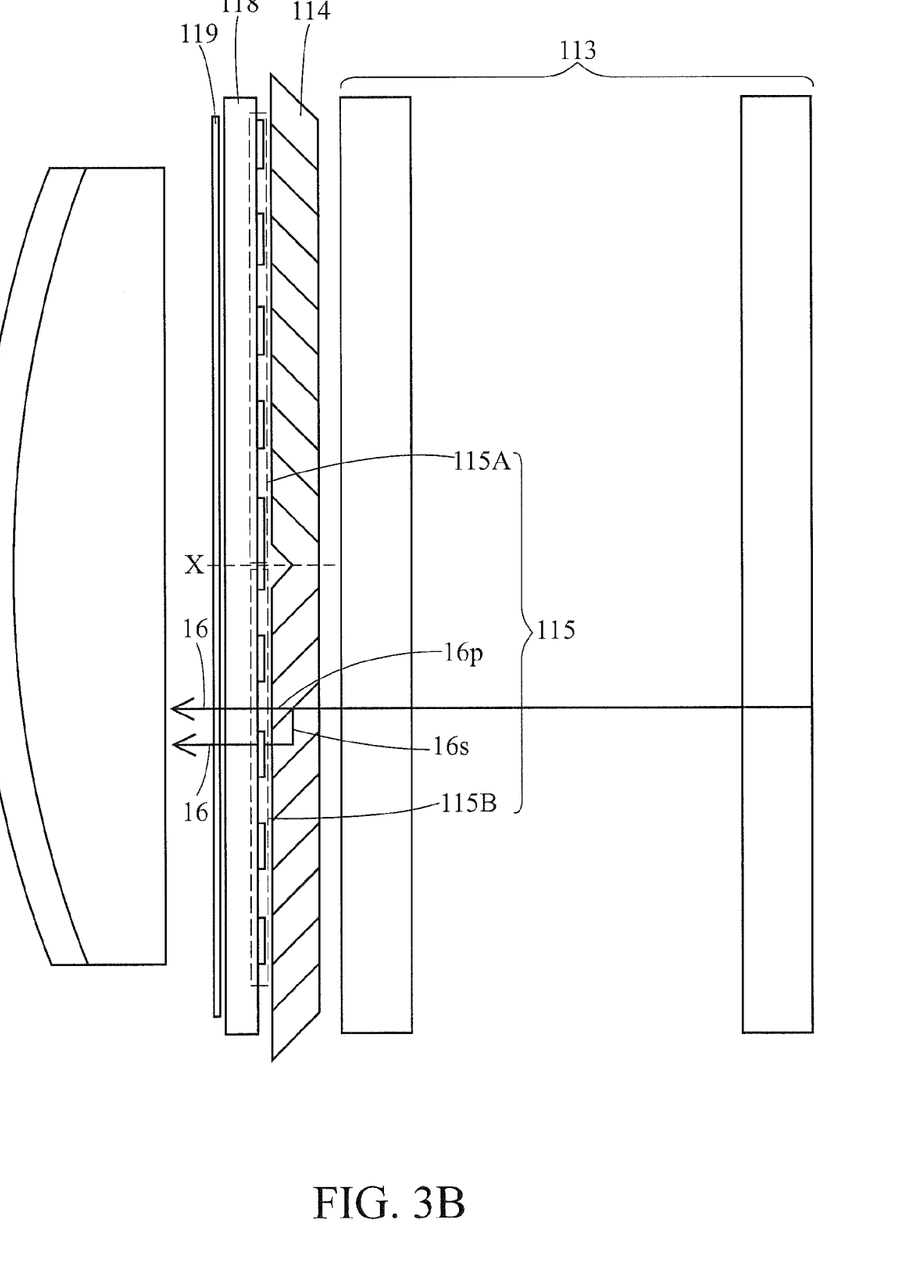
FIG. 3B is a schematic view illustrating a partial light path in a second time sequence according to the embodiment of the present invention.

With reference to FIGS. 1, 3A and 3B together, a schematic view illustrating an internal structure of a projection apparatus according to an embodiment of the present invention, a schematic view illustrating a partial light path in a first time sequence and a schematic view illustrating a partial light path in a second time sequence according to the embodiment of the present invention are shown therein respectively. The projection apparatus 1 comprises an illumination system 11, a light modulator 13, a projection lens 15, a light concentrating component 17 and a reflector 18. Hereinbelow, individual components of the illumination system 11 will be detailed.

The illumination system 11 comprises a light source assembly, a curved reflecting component 111, a phosphor color wheel 112, a light homogenizing component 113, a polarizer 114, a half wave retarder 115, a sheet glass 118 and a quarter wave retarder 119. The light source assembly comprises at least one light source adapted to generate a light. In this embodiment, the light source assembly comprises a first light source 116 and a second light source 117. The first light source 116 comprises four blue laser light sources for providing four blue laser lights simultaneously. The four blue laser lights are transformed by the curved reflecting component 111 and the phosphor color wheel 112 into two red lights and two green lights (to be detailed later). The second light source 117 comprises two blue light emitting diodes (LEDs) 117a, 117b, which provide two blue lights alternately. It shall be appreciated that the first light 116 and the second light provide lights alternately. Because solid-state light sources have been widely used in projectors, LED light sources may also be used in place of the laser light sources as the first light source of the present invention.

The curved reflecting component 111 has a curved surface (not labeled), and is formed with a breakthrough groove 111a at a bottom vertex thereof. The curved reflecting component 111 has a focus defined therein. A light splitting coating film 111b is coated on the curved surface of the curved reflecting component 111 to allow only lights of a specific waveband to pass therethrough but reflect lights of other wavebands. In this embodiment, only blue lights are allowed to pass through the light splitting coating film 111b, while lights of other colors are reflected by the light splitting coating film 111b. In this embodiment, the curved surface of the curved reflecting component 111 is an ellipsoid; however, in other embodiments of the present invention, the curved surface of the curved reflecting component 111 may also be readily devised as a paraboloid by people skilled in the art.

The phosphor color wheel 112 passes through the breakthrough groove 111a of the curved reflecting component 111 with the focus of the curved reflecting component 111 falling on the phosphor color wheel 112. The phosphor color wheel 112 is coated with at least one kind of phosphor in a region corresponding to the focus of the curved surface of the curved reflecting component 111. The phosphor may be coated in a circular or an annular form. Thus, the blue laser lights provided by the first light source 116 will be concentrated by the light concentrating component 17 to the focus of the curved reflecting component 111 so that the phosphor of the phosphor color wheel 112 coated correspondingly to the focus of the curved reflecting component 111 will be excited and generate a red or green. Thereby, the red or green light can be intensively reflected by the ellipsoid of the curved reflecting component 111.

In this embodiment, after the red or green light passes through the phosphor color wheel 112 in a first time sequence, a first light 10 is reflected intensively by the curved reflecting component 111. The other alternative is that after the red or green light is reflected by the phosphor color wheel 112 in a second time sequence, a second light 12 is reflected intensively by the curved reflecting component 111.

The light homogenizing component 113 is adapted to homogenize the first light 10 and the second light 12. In this embodiment, the light homogenizing component 113 is a lens array; however, in other embodiments, other forms of the light homogenizing component may also be readily devised by people skilled in the art, for example, a fly lens, an integration rod or a light tunnel.

The half wave retarder 115 is disposed at a side of the polarizer 114, and is formed on a first surface of the sheet glass 118. The half wave retarder 115 has a first time sequence portion and a second time sequence portion (i.e., an upper portion 115A and a lower portion 115B divided by the dashed line X). The quarter wave retarder 119 is formed on a second surface of the sheet glass 118; i.e., the quarter wave retarder 119 and the half wave retarder 115 are disposed on two opposite surfaces of the sheet glass 118 respectively. The polarizer 114 and the half wave retarder 115 can transform the first light 10 from the illumination system 11 into a first polarized light 14 in a first time sequence and transform the second light 12 into a second polarized light 16 in a second time sequence.

It shall be appreciated that because a phase difference of a quarter wavelength is caused by the quarter wave retarder 119, a light wave along an optic axis and a light wave perpendicular to the optic axis will be combined into a light wave whose polarization direction can rotate. Thus, even when the view angle of a viewer shifts, the image will not be shielded or become blurred or incomplete.

The light modulator 13 is adapted to receive and transform the first polarized light 14 into a first view angle image in the first time sequence, and receive and transform the second polarized light into a second view angle image in the second time sequence. The projection lens 15 projects the first view angle image and the second view angle image to a pair of passive eyeglasses. One of the first view angle image and the second view angle image passes through a left eyeglass, while the other passes through the right eyeglass so that the viewer can see a stereoscopic image. In this embodiment, the light modulator 3 is a digital micromirror device (DMD); however, a liquid crystal display (LCD) panel may also be used for the light modulator 3 in other embodiments.

Figure 2A:
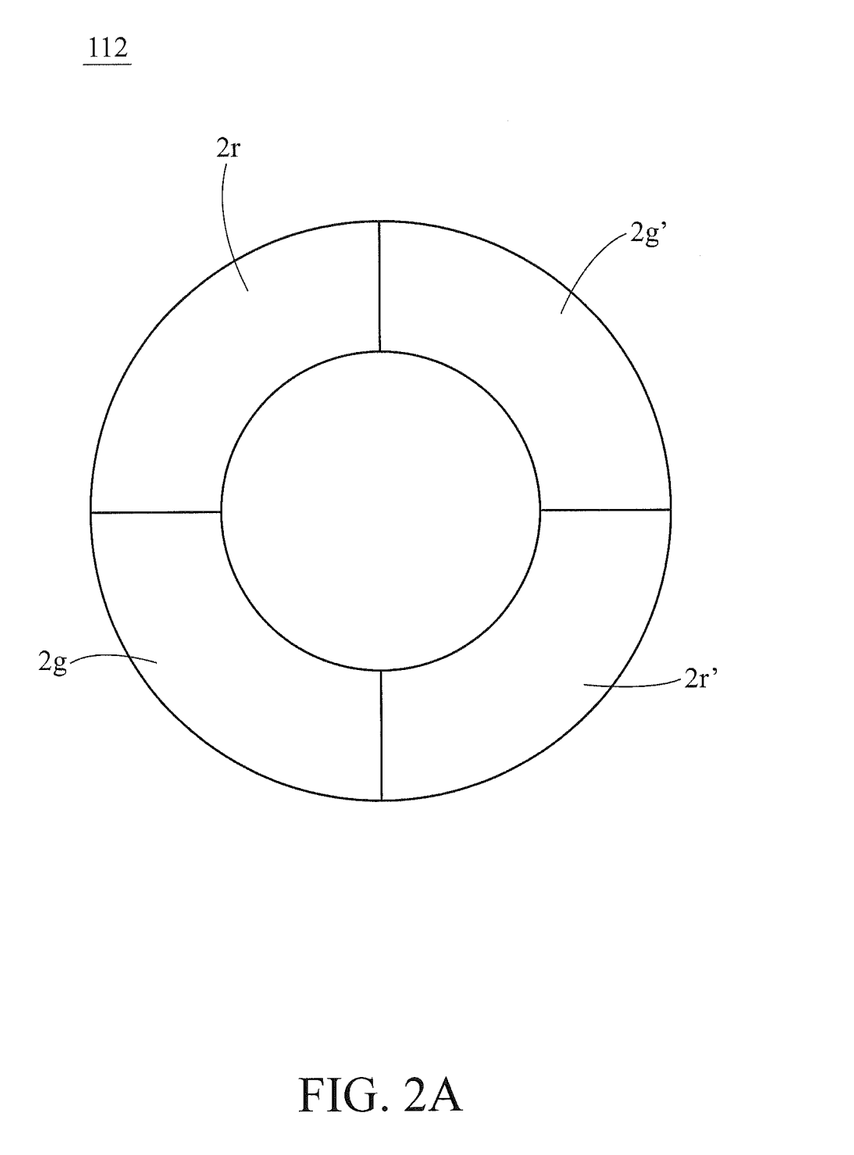
FIG. 2A is a schematic view of a phosphor color wheel according to the embodiment of the present invention.
Figure 2B:
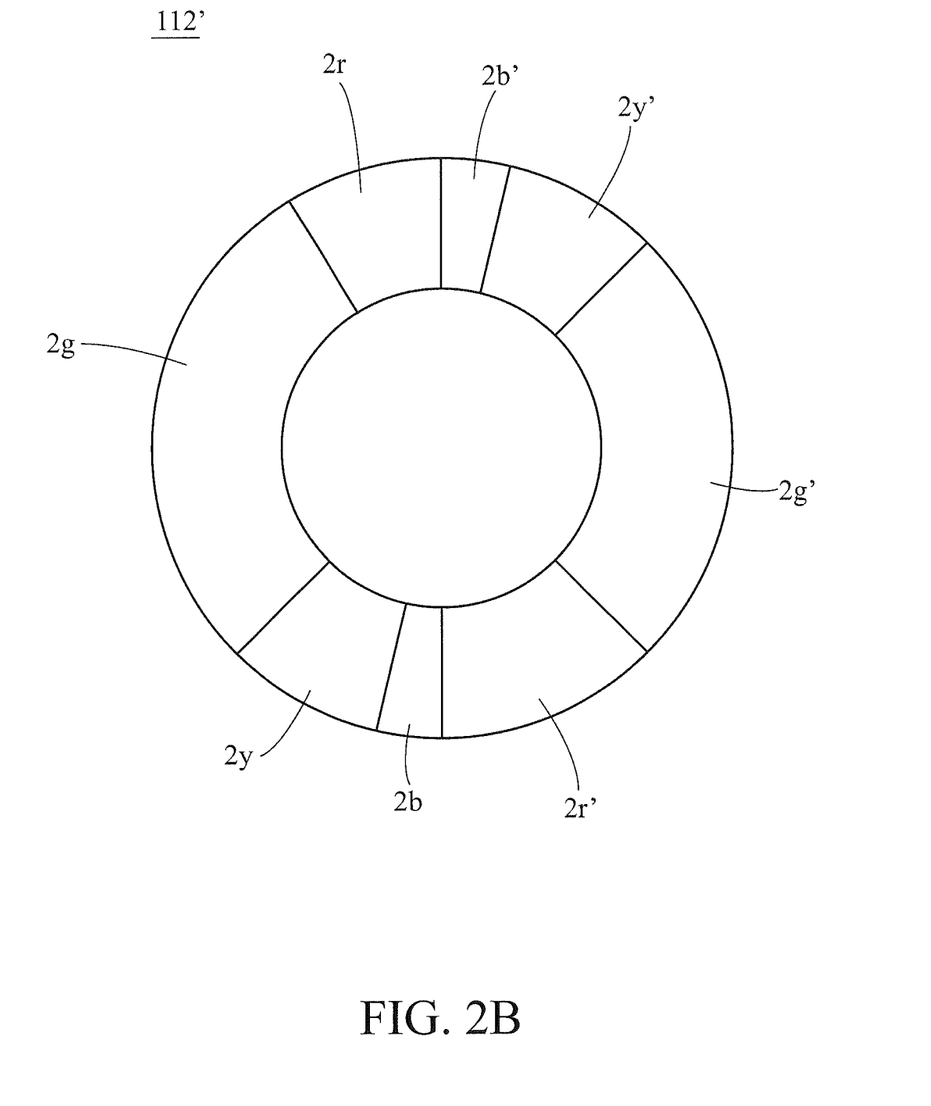
FIG. 2B is a schematic view of another implementation of the phosphor color wheel according to the present invention.

Now, the light paths of the lights will be detailed. First, with reference to FIG. 2A, a schematic view of the phosphor color wheel 112 according to this embodiment is shown therein. As shown, the phosphor color wheel 112 is coated with a phosphor for exciting the blue laser lights into a red light and also a phosphor for exciting the blue laser lights into a green light. In fact, the phosphor color wheel 112 is divided into a left portion and a right portion (which may also be understood as a front and a back side) for providing a red or green light in different time sequences. In this embodiment, the left portion that allows a light to pass therethrough is coated in two equal halves thereof with a phosphor for generating a red light (i.e., a region $2r$ in the left portion of the phosphor color wheel 112 shown in FIG. 2A) and a phosphor for generating a green light (i.e., a region $2g$ in the left portion of the phosphor color wheel 112 shown in FIG. 2A); and similarly, the right portion that reflects a light is coated in two equal halves thereof with a phosphor for generating a red light (i.e., a region $2r'$ in the right portion of the phosphor color wheel 112 shown in FIG. 2A) and a phosphor for generating a green light (i.e., a region $2g'$ in the right portion of the phosphor color wheel 112 shown in FIG. 2A). From this concept, other implementations of phosphor coating may also be devised by people skilled in the art. For example, as shown in FIG. 2B, the left portion and the right portion are transmissive and reflective respectively, and are each coated with phosphors for generating a red light, a green light and a yellow light (i.e., regions $2r$, $2g$ and $2y$ as well as $2r'$, $2g'$ and $2y'$ of the phosphor color wheel 112' shown in FIG. 2B). Likewise, the left portion and the right portion further have a region that is transmissive and reflective for a blue light respectively (i.e., a region $2b$ and a region $2b'$ of the phosphor color wheel 112' shown in FIG. 2B). In order for image colors generated subsequently to satisfy the requirements, percentages of these regions are different.

Transformation of lights in the illumination system 11 will be further detailed as follows. Still, with reference to FIG. 1, in the embodiment of the present invention, the blue laser lights are first concentrated by the light concentrating component 17 located at a back end of the first light source 116 to the focus of the curved reflecting component 111. In the first time sequence, the blue laser lights from the first light source 116 are projected onto the transmissive left portion of the phosphor color wheel 112 to excite generation of a red and green light respectively at different time points, and then the red or green light is concentrated by the curved surface of the curved reflecting component 111 into a first light 10; and in the second time sequence, the blue laser lights from the first light source 116 are projected onto the reflective right portion of the phosphor color wheel 112 to excite generation of a red and green light respectively at different time points. The red or green light is concentrated by the curved reflecting component 111 into a second light 12.

In the first time sequence, the first light 10 is reflected by the reflector 18 into the light homogenizing component 113; and in the second time sequence, the second light 12 is also reflected by the reflector 18 into the light homogenizing component 113. In this embodiment, because the use of the curved reflecting component 111 makes the first light and the second light travel along different light paths, the first light 10 reflected by the reflector 18 will be processed by an upper half of the subsequent optical components in the illumination system 11, while the second light 12 reflected by the reflector 18 will be processed by a lower half of the subsequent optical components in the illumination system 11. The subsequent optical components described herein at least include the light homogenizing component 113, the polarizer 114, the half wave retarder 115, the sheet glass 118 and the quarter wave retarder 119.

The first light source 116 and the second light source 117 provide lights simultaneously. Therefore, after the first light 10 (which is made of a red and green light and is excited by the phosphor color wheel 112) is provided by the first light source 116 in the first time sequence and reflected intensively by the curved reflecting component 111, a blue light is provided by the blue LED 117a of the second light source 117, also in the first time sequence and travels along the same light path as the first light 10. On the other hand, after the second light 12 (which is made of a red and green sequentially and is excited by the phosphor color wheel 112) is provided by the first light source 116 in the second time sequence and reflected intensively by the curved reflecting component 111, a blue light is also provided by the blue LED 117b of the second light source 117 in the second time sequence and travels along the same light path as the second light 12. In other words, the phosphor color wheel 112 cooperates with the first light source 116 and the blue LED 117a to provide a red light, a green light and a blue light sequentially in the first time sequence, and cooperates with the first light source 116 and the blue LED 117b to provide a red light, a green light and a blue light sequentially in the second time sequence. However, as will be readily appreciated by people skilled in the art, the sequence of color lights provided in the present invention is not limited to what has been illustrated above.

Next, the propagation of lights in the different time sequences will be described. FIGS. 3A and 3B show schematic views of light paths in the polarizer 114, the half wave retarder 115, the sheet glass 118 and the quarter wave retarder 119 of the aforesaid embodiment corresponding to the first time sequence and the second time sequence respectively.

In detail, as shown in FIG. 3A, the first light 10 (which is a red light, a green light or a blue light at different time points) is split by the upper portion of the polarizer 114 into a first beam 14s with a first polarization direction and a second beam 14p with a second polarization direction in the first time sequence. The first beam 14s with the first polarization direction is generated through the reflection by a polarization coating film of the polarizer 114, while the second beam 14p with the second polarization direction transmits through the polarization coating film of the polarizer 114. Then, only the second beam 14p with the second polarization direction passes through the upper first time sequence portion of the half wave retarder 115 and is then transformed into a light beam also with the first polarization direction. Therefore, the first polarized lights 14 passing through the sheet glass 18 both have the first polarization direction which, in this embodiment, is the S polarization direction.

As shown in FIG. 3B, the second light 12 (which is a red light, a green light or a blue light at different time points) is split by the lower portion of the polarizer 114 into a third beam 16s with the first polarization direction and a fourth beam 16p with the second polarization direction in the second time sequence. The third beam 16s with the first polarization direction is generated through reflection by the polarization coating film of the polarizer 114, while the fourth beam 16p with the second polarization direction transmits through the polarization coating film of the polarizer 114. Then, only the third beam 16s with the first polarization direction passes through the lower second time sequence portion of the half wave retarder 115 and is then transformed into a light beam also with the second polarization direction. Therefore, the second polarized lights 16 passing through the sheet glass 118 both have second polarization directions which, in this embodiment, is the P polarization direction.

It shall be noted that to transform lights with different polarization directions into a same polarization direction, the size of the half wave retarder 115 disposed at the back of the polarizer 114 must coordinate with an angle of the polarization coating film of the polarizer 114.

Additionally, the polarizer 114 and the half wave retarder 115 split the light into two polarized lights with different polarization directions, namely, a polarization direction along the optic axis and a polarization direction perpendicular to the optic axis. When a viewer's head tilts (i.e., when the pair of passive eyeglasses is not completely aligned with the polarization directions), it is very likely that the first view angle image and the second view angle image will transmit through the left eyeglass and the right eyeglass simultaneously and cause blurring of the images.

To avoid the occurrence of this problem, a quarter wave retarder 119 is disposed at a back end of the half wave retarder 115 in this embodiment. The half wave retarder 115 and the quarter wave retarder 119 together form a circular polarizer or an elliptical polarizer. Generally, the circular polarizer or the elliptical polarizer consisting of the half wave retarder 115 and the quarter wave retarder 119 may further divide the light into a left-hand polarized light or a right-hand polarized light, but the present invention has no limitation thereon.

Figure 4A:
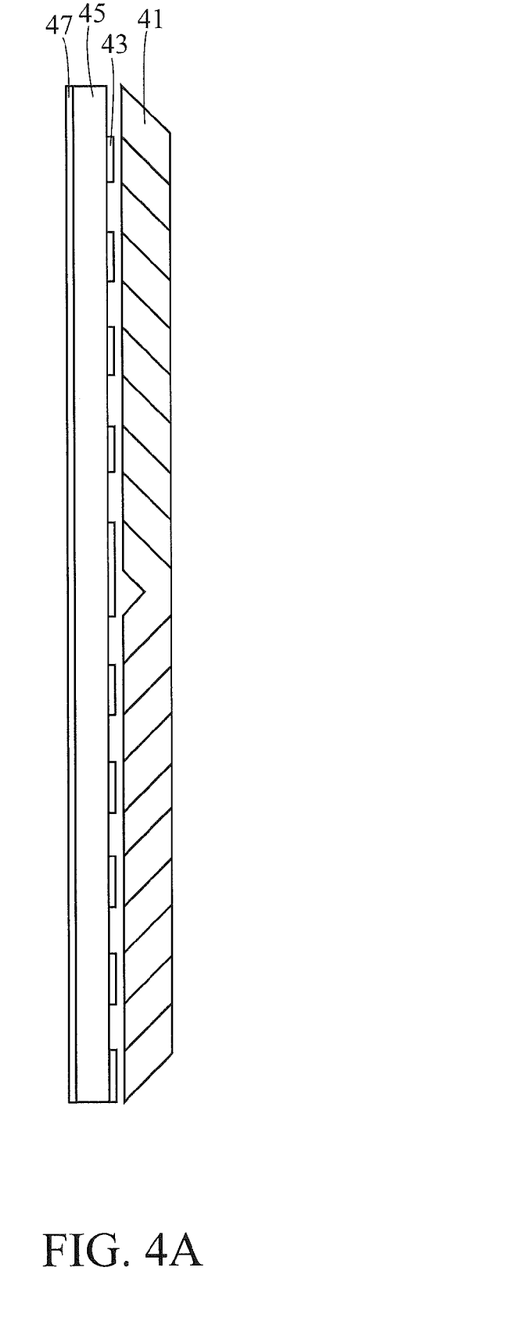
FIG. 4A is a schematic view illustrating an arrangement scheme of a part of components in an illumination system of the projection apparatus according to the present invention.
Figure 4B:
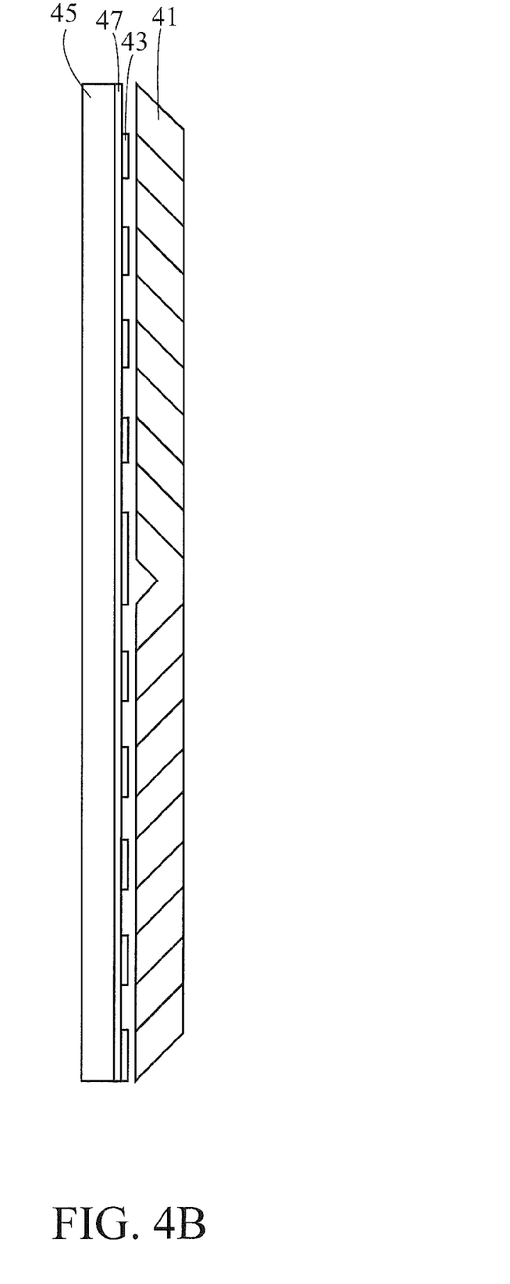
FIG. 4B is a schematic view illustrating another arrangement scheme of a part of components in the illumination system of the projection apparatus according to the present invention.

FIGS. 4A and 4B show schematic views of different arrangement schemes of the polarizer, the half wave retarder, the sheet glass and the quarter wave retarder of the present invention respectively. As shown in FIG. 4A, the half wave retarder 43, the sheet glass 45 and the quarter wave retarder 47 are all disposed at a side of the polarizer 41, with the half wave retarder 43 being formed on a first surface of the sheet glass 45 and the quarter wave retarder 47 being formed on a second surface of the sheet glass 45 opposite to the half wave retarder 43. Alternatively, as shown in FIG. 4B, the half wave retarder 43, the sheet glass 45 and the quarter wave retarder 47 are all disposed at a side of the polarizer 41, with the half wave retarder 43 being formed directly on the quarter wave retarder 47 and the other side of the quarter wave retarder 47 being attached onto the sheet glass 45.

According to the above descriptions, the primary objective of the illumination system and the projection apparatus adopting the illumination system of the present invention is to switch between left-hand polarized lights and right-hand polarized lights provided by the illumination system in different time sequences alternately so that different polarized images can be seen by the left eye and the right eye respectively to achieve a stereoscopic displaying effect. This can avoid the problem that arrangement of two projectors occupies a large area and leads to a high cost. As another objective, the illumination system and the projection apparatus of the present invention can be used with a pair of inexpensive eyeglasses and are not liable to damage, so the overall cost can be reduced. Furthermore, as compared to the practice of using active polarizers, the use of polarized lights to display stereoscopic images can deliver a higher brightness. Moreover, because of the reduced cost, the illumination system and the projection apparatus of the present invention are suitable for use in large-scale service places.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system for a projection apparatus, comprising:
    at least one light source for generating a light;
    a curved reflecting component having a breakthrough groove;
    a phosphor color wheel being disposed in the breakthrough groove, wherein after the light penetrates the phosphor color wheel in a first time sequence, a first light is reflected from the curved reflecting component, and after the light is reflected from the phosphor color wheel in a second time sequence, a second light is reflected from the curved reflecting component;
    a polarizer for splitting the first light into a first beam having a first polarization direction and a second beam having a second polarization direction in the first time sequence, and splitting the second light into a third beam having the first polarization direction and a fourth beam having the second polarization direction in the second time sequence; and
    a half wave retarder having a first time sequence portion and a second time sequence portion, and being disposed at a side of the polarizer;
    wherein after the first beam and the second beam pass through the first time sequence portion of the half wave retarder in the first time sequence, the first beam and the second beam are transformed into a first polarization light having the first polarization direction, and after the third beam and the fourth beam pass through the second time sequence portion of the half wave retarder in the second time sequence, the third beam and the fourth beam are transformed into a second polarization light having the second polarization direction.

2. The illumination system as claimed in claim 1, wherein the half wave retarder is formed on a first surface of a sheet glass.

3. The illumination system as claimed in claim 1, further comprising a quarter wave retarder, and the half wave retarder is disposed between the quarter wave retarder and the polarizer.

4. The illumination system as claimed in claim 1, further comprising a quarter wave retarder disposed on a second surface of the sheet glass opposite to the first surface on which the half wave retarder is formed.

5. The illumination system as claimed in claim 1, wherein the half wave retarder is formed on a surface of a quarter wave retarder.

6. The illumination system as claimed in claim 1, wherein the at least one light source is a light emitting diode (LED) or a laser.

7. The illumination system as claimed in claim 1, further comprising a light homogenizing component to homogenize the first light and the second light, and the light homogenizing component is a lens array, a fly lens, an integration rod, or a light tunnel.

8. The illumination system as claimed in claim 1, wherein the curved reflecting component comprises at least one curved surface which is an ellipsoid or a paraboloid.

9. The illumination system as claimed in claim 8, wherein the curved surface has a focus, and the phosphor color wheel is coated with at least one phosphor on the focus.

10. The illumination system as claimed in claim 8, wherein the curved surface is coated with a light splitting coating film which only allows lights of a special waveband to pass therethrough.

11. A projection apparatus, comprising:
   an illumination system as claimed in claim 1, the illumination system providing the first polarized light in the first time sequence and providing the second polarized light in the second time sequence; and
   a light modulator for receiving and transforming the first polarized light into a first view angle image in the first time sequence and receiving and transforming the second polarized light into a second view angle image in the second time sequence.

12. The projection apparatus as claimed in claim 11, wherein the light modulator is a digital micromirror device (DMD) or a liquid crystal display (LCD) panel.

* * * * *